US012710810B2

(12) United States Patent
Uchidate

(10) Patent No.: US 12,710,810 B2
(45) Date of Patent: Aug. 18, 2026

(54) IMAGE PROCESSING DEVICE

(71) Applicant: CANON KABUSHIKI KAISHA, Tokyo (JP)

(72) Inventor: Hikaru Uchidate, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 18/791,490

(22) Filed: Aug. 1, 2024

(65) Prior Publication Data

US 2025/0069209 A1 Feb. 27, 2025

(30) Foreign Application Priority Data

Aug. 24, 2023 (JP) ................................ 2023-136316

(51) Int. Cl.

*G06T 5/92* (2024.01)
*G06F 3/01* (2006.01)
*G06T 11/60* (2026.01)
*G06V 10/60* (2022.01)

(52) U.S. Cl.

CPC ................ *G06T 5/92* (2024.01); *G06F 3/012* (2013.01); *G06T 11/60* (2013.01); *G06V 10/60* (2022.01)

(58) Field of Classification Search

CPC ......... G06T 5/92; G06T 11/60; G06T 19/006; G06F 3/012; G06V 10/60

See application file for complete search history.

(56) References Cited

U.S. PATENT DOCUMENTS

| | | | | |
|---|---|---|---|---|
| 9,396,588 | B1 * | 7/2016 | Li | G02B 27/017 |
| 2016/0033770 | A1 * | 2/2016 | Fujimaki | H04N 13/344 345/8 |
| 2017/0337712 | A1 * | 11/2017 | Nakashima | H04N 13/315 |
| 2018/0218714 | A1 * | 8/2018 | Yamaguchi | G06T 5/80 |
| 2020/0296354 | A1 * | 9/2020 | Bickerstaff | G06F 3/04815 |
| 2020/0359008 | A1 * | 11/2020 | Tanaka | H04N 13/398 |
| 2021/0241425 | A1 * | 8/2021 | Uchidate | G06T 5/50 |

FOREIGN PATENT DOCUMENTS

| | | |
|---|---|---|
| JP | 2003-337299 A | 11/2003 |
| JP | 2017-215688 A | 12/2017 |

* cited by examiner

*Primary Examiner* — Utpal D Shah
(74) *Attorney, Agent, or Firm* — Carter, DeLuca & Farrell LLP

(57) ABSTRACT

An image processing device acquires a first image that is an image of an area based on at least one of a position and an orientation of a head of a user, and a second image that is an image of an area based on at least one of the position and the orientation of the head, the second image including a portion corresponding to a portion of the first image, acquires information regarding movement of the head, generates, on a basis of the information, a third image by moving or transforming the first image and to generate a fourth image by moving or transforming the second image, and performs gradation processing on each of the third image and the fourth image, wherein in the second image processing, the gradation processing is performed on a basis of the information.

13 Claims, 12 Drawing Sheets

LEFT
RIGHT

PERCEPTION

START
OBTAIN LATEST HMD POSITION/ ORIENTATION INFORMATION Q
S501
OBTAIN PAST HMD POSITION/ ORIENTATION INFORMATION R
S502
DETERMINE IMAGE SHIFT VALUES SX, SY
S503
SET IMAGE SHIFT VALUES SX, SY FOR CONVERSION UNITS 106L, 106R
S504
SX > 0?
S505
NO
YES
SET IMAGE SHIFT VALUES SX, SY FOR GRADATION UNIT 103R
S506
SET IMAGE SHIFT VALUES SX, SY FOR GRADATION UNIT 103L
S507
HOLD INFORMATION Q
S508
END

LEFT
RIGHT

PERCEPTION

LEFT
RIGHT

PERCEPTION

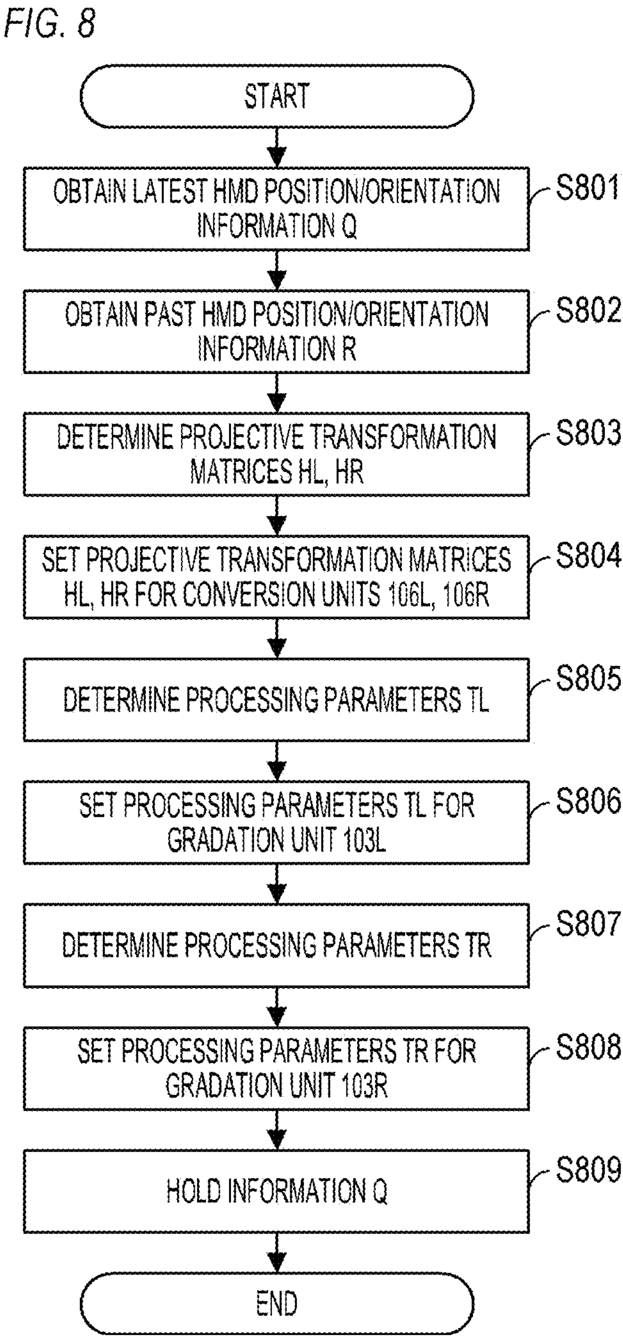
FIG. 8
START
OBTAIN LATEST HMD POSITION/ORIENTATION INFORMATION Q
S801
OBTAIN PAST HMD POSITION/ORIENTATION INFORMATION R
S802
DETERMINE PROJECTIVE TRANSFORMATION MATRICES HL, HR
S803
SET PROJECTIVE TRANSFORMATION MATRICES HL, HR FOR CONVERSION UNITS 106L, 106R
S804
DETERMINE PROCESSING PARAMETERS TL
S805
SET PROCESSING PARAMETERS TL FOR GRADATION UNIT 103L
S806
DETERMINE PROCESSING PARAMETERS TR
S807
SET PROCESSING PARAMETERS TR FOR GRADATION UNIT 103R
S808
HOLD INFORMATION Q
S809
END

LEFT
RIGHT

PERCEPTION

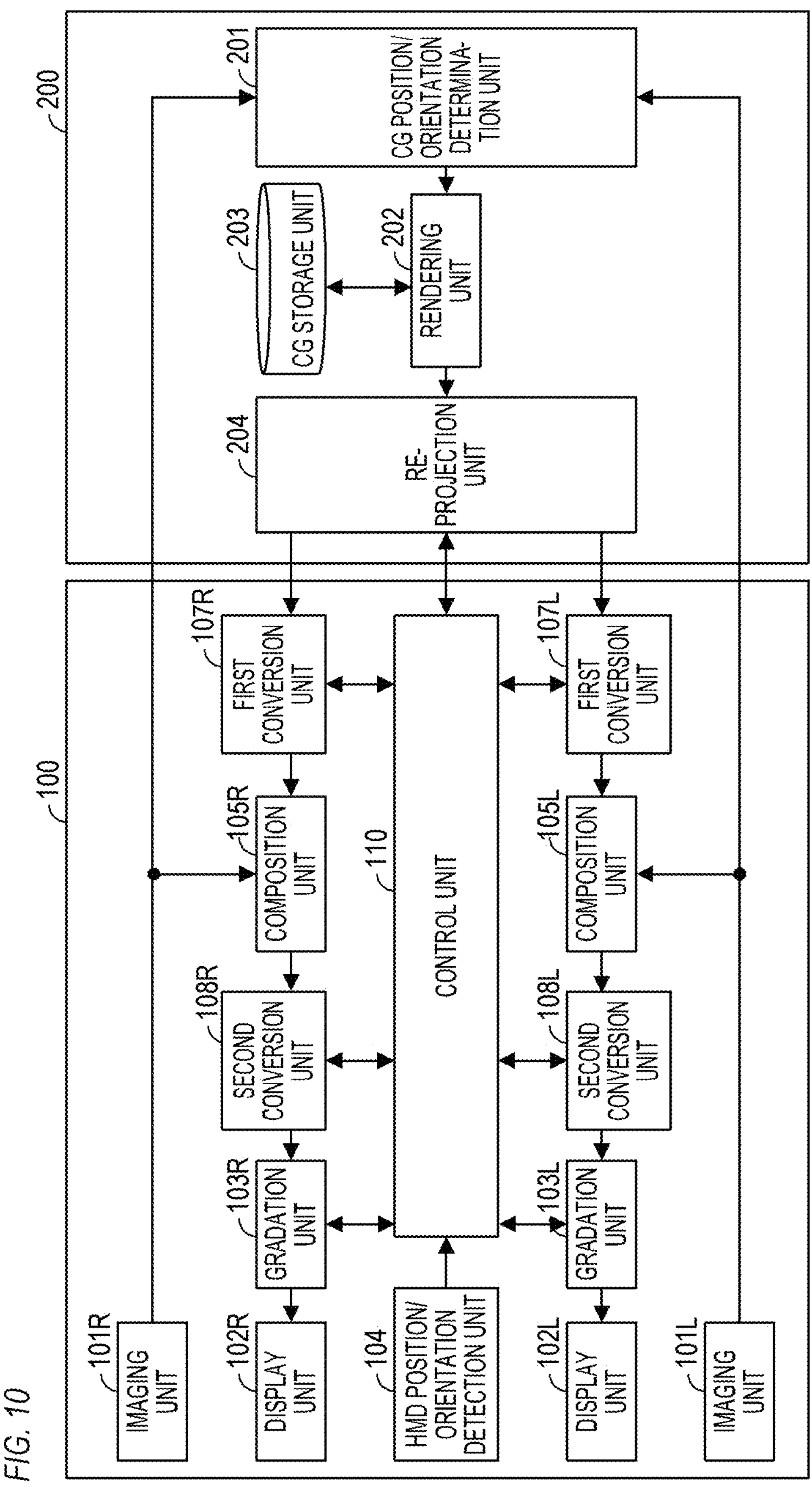
FIG. 10
100
200
101R
IMAGING UNIT
102R
DISPLAY UNIT
104
HMD POSITION/ ORIENTATION DETECTION UNIT
102L
DISPLAY UNIT
101L
IMAGING UNIT
103R
GRADATION UNIT
103L
GRADATION UNIT
108R
SECOND CONVERSION UNIT
108L
SECOND CONVERSION UNIT
110
CONTROL UNIT
105R
COMPOSITION UNIT
105L
COMPOSITION UNIT
107R
FIRST CONVERSION UNIT
107L
FIRST CONVERSION UNIT
204
RE- PROJECTION UNIT
203
CG STORAGE UNIT
202
RENDERING UNIT
201
CG POSITION/ ORIENTATION DETERMINA- TION UNIT

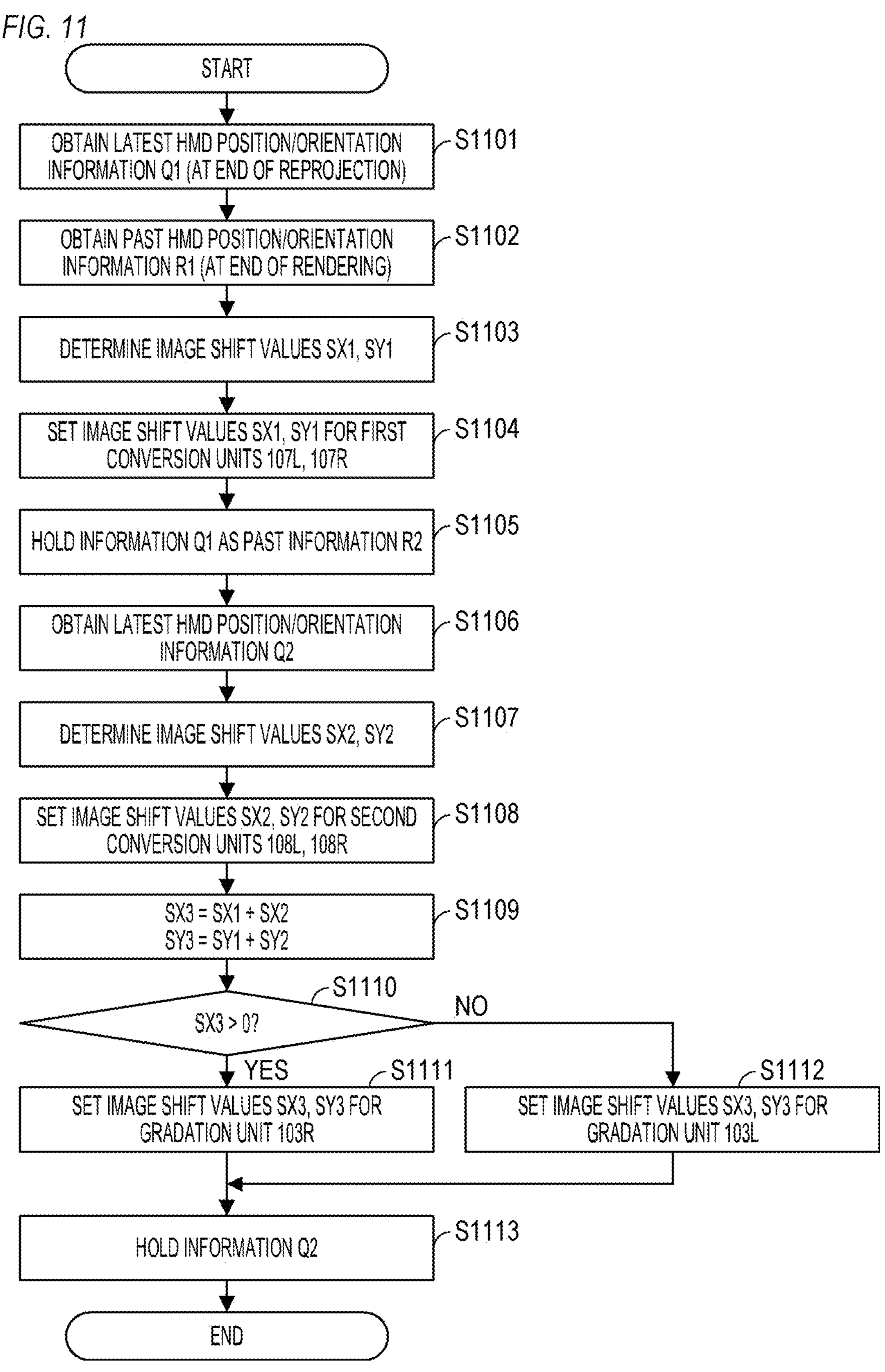
FIG. 11
START
OBTAIN LATEST HMD POSITION/ORIENTATION INFORMATION Q1 (AT END OF REPROJECTION)
S1101
OBTAIN PAST HMD POSITION/ORIENTATION INFORMATION R1 (AT END OF RENDERING)
S1102
DETERMINE IMAGE SHIFT VALUES SX1, SY1
S1103
SET IMAGE SHIFT VALUES SX1, SY1 FOR FIRST CONVERSION UNITS 107L, 107R
S1104
HOLD INFORMATION Q1 AS PAST INFORMATION R2
S1105
OBTAIN LATEST HMD POSITION/ORIENTATION INFORMATION Q2
S1106
DETERMINE IMAGE SHIFT VALUES SX2, SY2
S1107
SET IMAGE SHIFT VALUES SX2, SY2 FOR SECOND CONVERSION UNITS 108L, 108R
S1108
SX3 = SX1 + SX2
SY3 = SY1 + SY2
S1109
SX3 > 0?
S1110
NO
YES
SET IMAGE SHIFT VALUES SX3, SY3 FOR GRADATION UNIT 103R
S1111
SET IMAGE SHIFT VALUES SX3, SY3 FOR GRADATION UNIT 103L
S1112
HOLD INFORMATION Q2
S1113
END

IMAGE PROCESSING DEVICE

BACKGROUND OF THE INVENTION

Field of the Invention

The present invention provides an image processing device.

Description of the Related Art

Mixed Reality (MR) technology is a known technology that seamlessly blends the real world and a virtual world in real time. A known MR technology involves capturing an image of the real space (object) in front of a Head Mounted Display (HMD) with a video camera, and presenting (displaying) to the user an MR image in which Computer Graphics (CG) are superimposed on the image of the real space. This type of HMD is called a video see-through HMD.

In an HMD, it is desirable that the user be able to view images over a wide area (angle of view) so that the user can experience a high sense of immersion. An image for the left eye (left image) and an image for the right eye (right image) that satisfy the following conditions allow for viewing of images of wide areas.

- The image area on the right side of the left image (the side closer to the nose of the user wearing the HMD) and the image area on the left side of the right image (the side closer to the nose of the user wearing the HMD) are overlapping portions that correspond to each other.
- The image area on the left side of the left image (the side closer to the left ear of the user wearing the HMD) and the image area on the right side of the right image (the side closer to the right ear of the user wearing the HMD) are non-overlapping portions that do not correspond to each other.

When the left and right images that satisfy the above conditions are displayed, the non-overlapping portion of the left image is only visually perceived with the left eye, and the overlapping portion is visually perceived with the right eye as a black portion, such as a frame of the display unit. Similarly, the non-overlapping portion of the right image is visually perceived only with the right eye, and the overlapping portion is visually perceived as a black portion with the left eye. This causes binocular rivalry between the left and right eyes. The binocular rivalry causes the boundary portions between the non-overlapping portions and the overlapping portions to be more noticeable, impeding natural observation by the user.

Japanese Patent Application Publication No. 2003-337299 discloses an HMD that reduces the brightness of an image from a predetermined position with a predetermined reduction curve so that the black portion is less noticeable.

However, when changing the area of the image (display area) in response to movement of the user's head, there is a delay in the change of the display area relative to the head movement. To reduce (limit) this delay, image processing may be performed to move the image in a direction that cancels out the head movement. When this image processing is performed with the HMD disclosed in Japanese Patent Application Publication No. 2003-337299, the change of the boundary portion between the non-overlapping portion and the overlapping portion changes would prevent the boundary portion from becoming less noticeable, so that the user is unable to observe naturally.

SUMMARY OF THE INVENTION

The present invention provides a technique that can obtain a suitable image (an image that allows natural observation over a wide area) even when performing image processing that reduces (limits) a delay in changing the display area.

The present invention in its first aspect provides an image processing device including one or more processors and/or circuitry configured to perform first acquisition processing to acquire a first image that is an image for a left eye, the first image being an image of an area based on at least one of a position and an orientation of a head of a user, and a second image that is an image for a right eye, the second image being an image of an area based on at least one of the position and the orientation of the head and including a portion corresponding to a portion of the first image, perform second acquisition processing to acquire information regarding movement of the head, perform, on a basis of the information, first image processing to generate a third image by moving or transforming the first image and to generate a fourth image by moving or transforming the second image, and perform second image processing to perform gradation processing on each of the third image and the fourth image, wherein in the second image processing, the gradation processing is performed on a basis of the information.

The present invention in its second aspect provides an image processing method including acquiring a first image that is an image for a left eye, the first image being an image of an area based on at least one of a position and an orientation of a head of a user, and a second image that is an image for a right eye, the second image being an image of an area based on at least one of the position and the orientation of the head and including a portion corresponding to a portion of the first image, acquiring information regarding movement of the head, generating, on a basis of the information, a third image by moving or transforming the first image and to generate a fourth image by moving or transforming the second image, and performing gradation processing on each of the third image and the fourth image, wherein the gradation processing is performed on a basis of the information.

The present invention in its third aspect provides a non-transitory computer readable medium that stores a program, wherein the program causes a computer to execute an image processing method including acquiring a first image that is an image for a left eye, the first image being an image of an area based on at least one of a position and an orientation of a head of a user, and a second image that is an image for a right eye, the second image being an image of an area based on at least one of the position and the orientation of the head and including a portion corresponding to a portion of the first image, acquiring information regarding movement of the head, generating, on a basis of the information, a third image by moving or transforming the first image and to generate a fourth image by moving or transforming the second image, and performing gradation processing on each of the third image and the fourth image, wherein the gradation processing is performed on a basis of the information.

Further features of the present invention will become apparent from the following description of exemplary embodiments with reference to the attached drawings.

BRIEF DESCRIPTION OF THE DRAWINGS

FIG. 8 is a flowchart showing an operation example according to the second embodiment;

FIG. 10 is a block diagram showing an example of the configuration of a system according to a third embodiment;

FIG. 11 is a flowchart showing an operation example according to the third embodiment.

DESCRIPTION OF THE EMBODIMENTS

First Embodiment

A first embodiment of the present invention is now described. An example is described in which the present invention is applied to Mixed Reality (MR) technology, which presents (displays) to a user a composite image in which a CG object (virtual object) is superimposed on a real space image, but the present invention is not limited to this. For example, the present invention may be applied to Virtual Reality (VR) technology, which presents (displays) to a user a composite image in which a virtual object is superimposed on a virtual space image.

Configuration

Figure 1:
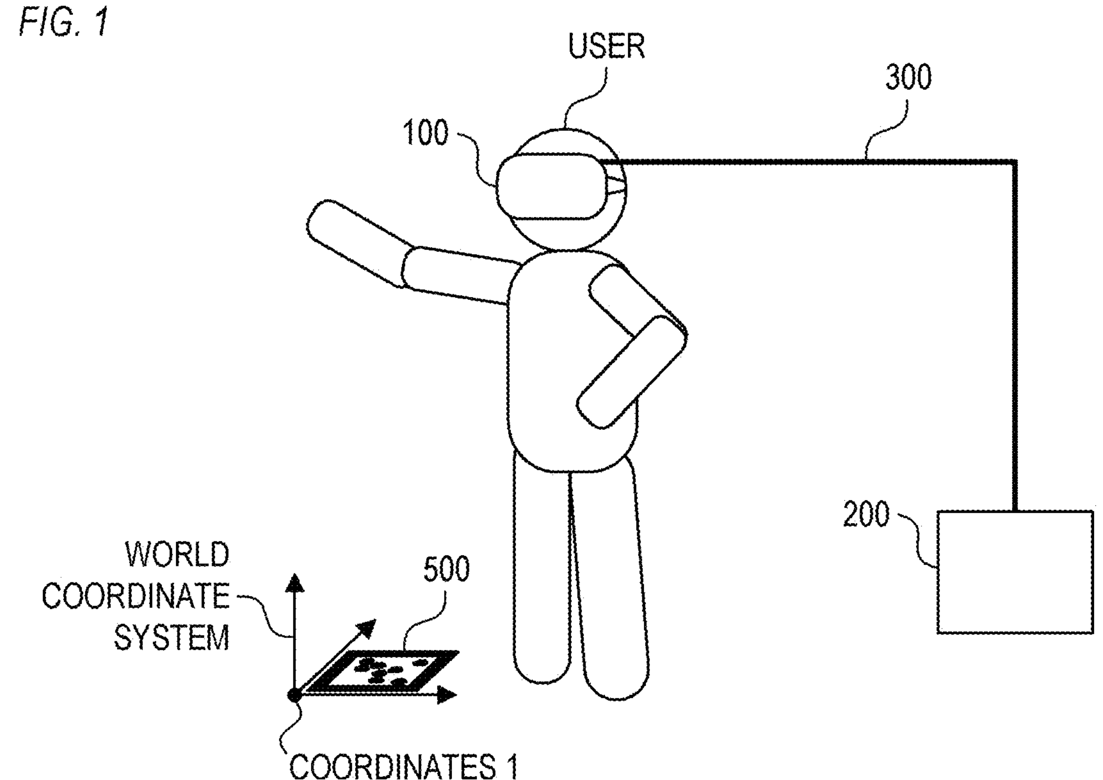
FIG. 1 is a schematic view showing an example of the configuration of a system according to a first embodiment.

FIG. 1 is a schematic view showing an example of the configuration of a system according to the first embodiment.

The system in FIG. 1 includes a Head Mounted Display (HMD) 100 and an information processing device 200. The HMD 100 is worn on the user's head and displays images to provide the user with an MR experience. The information processing device 200 generates images for the MR experience. A cable 300 is connected to the HMD 100 and the information processing device 200, and the HMD 100 and the information processing device 200 can transmit and receive data to and from each other via the cable 300. The data transmitted and received is not limited to image data. For example, sensor data, audio data, or control data may be transmitted and received. Sensor data output from an acceleration sensor or an angular velocity sensor provided in the HMD 100 may be transmitted from the HMD 100 to the information processing device 200. Control data for controlling the HMD 100 may be transmitted from the information processing device 200 to the HMD 100. Furthermore, although an example is described below in which wired communication is performed between the HMD 100 and the information processing device 200 using the cable 300, wireless communication may also be performed between the HMD 100 and the information processing device 200.

The HMD 100 captures images of real space with a camera facing forward, and displays MR images in which the images of the real space (camera images) are combined with CG (CG images). The information processing device 200 determines the rendering position of the CG on the basis of the camera image or tracking data, and performs CG rendering. To determine an appropriate position and orientation of the CG, a marker 500 may be placed in real space (for example, on a floor), and the position and orientation of the marker 500 may be detected from the camera image. This generates CG (world coordinate CG) corresponding to coordinates 1 (world coordinates) of a world coordinate system that are uniquely defined with reference to the marker 500, and an MR image is generated by compositing the world coordinates CG with the camera image. FIG. 1 shows the world coordinates 1 at (near) the position of the marker 500, but the world coordinates 1 may be located away from the marker 500.

The information processing device 200 may be a stationary computer such as a personal computer or a workstation, or may be a mobile terminal such as a smartphone or a wearable device. The information processing device 200 may be a part of the HMD 100. The information processing device 200 may be divided into multiple devices. At least one of the functions of the information processing device 200 may be performed on a cloud (server) or within the HMD 100. Similarly, the HMD 100 may be divided into multiple devices. At least one of the multiple functions of the HMD 100 may be performed on the cloud or within the information processing device 200. The image processing device according to the first embodiment may be provided in the HMD 100, in the information processing device 200, or in another device.

Figure 2:
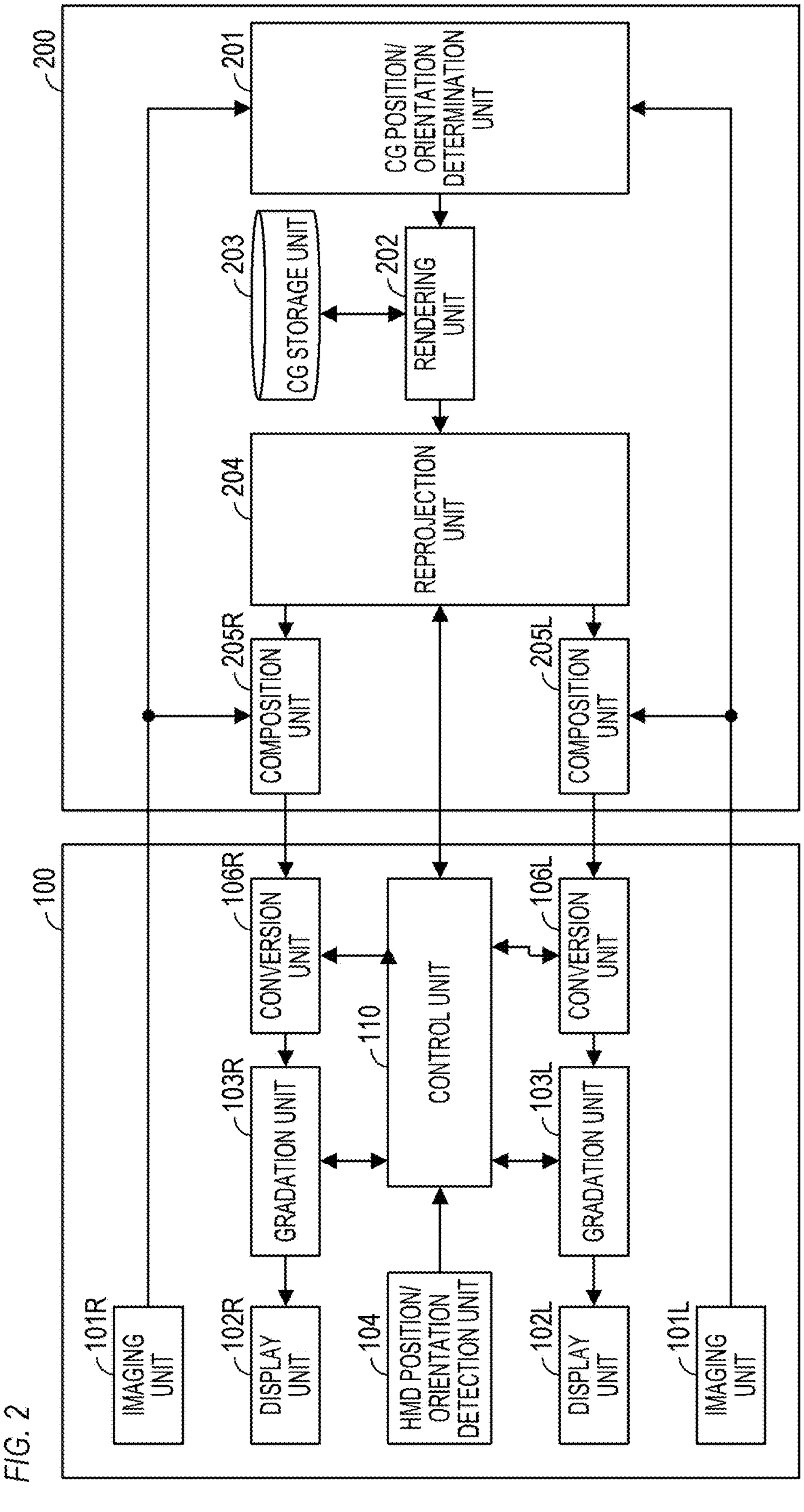
FIG. 2 is a block diagram showing an example of the configuration of the system according to the first embodiment.

FIG. 2 is a block diagram showing an example of the configuration of the system shown in FIG. 1.

The information processing device 200 includes a CG position/orientation determination unit 201, a rendering unit 202, a CG storage unit 203, a reprojection unit 204, a composition unit 205L, and a composition unit 205R.

The CG position/orientation determination unit 201 determines the position and orientation of CG. For example, the CG position/orientation determination unit 201 detects the position and orientation of the marker 500 placed in real space from a camera image (image of real space) obtained by the camera of the HMD 100 (an imaging unit 101L or an imaging unit 101R described below). Then, the CG position/orientation determination unit 201 detects the position and orientation of the HMD 100 in real space on the basis of the position and orientation of the marker 500, and determines the CG position and orientation. At this time, the CG position/orientation determination unit 201 may detect the world coordinates 1 of the CG on the basis of the position and orientation of the marker 500, and convert the world coordinates 1 into camera coordinates (coordinates in a camera coordinate system based on the camera position and orientation). Since the marker 500 does not move in real space, it is possible to determine the relative positional relationship between the HMD 100 and the marker 500 and convert the world coordinates 1 into camera coordinates even when the user wearing the HMD 100 moves around.

The method for determining the position and orientation of the CG is not limited to the above method. For example, the CG position/orientation determination unit 201 may detect characteristic points of an immovable object in the real space, detect the position and orientation of the HMD 100 on the basis of the characteristic points, and determine the CG position and orientation. The CG position/orientation determination unit 201 may detect characteristic points of the HMD 100 using an external camera, detect the position and orientation of the HMD 100 on the basis of the characteristic points, and determine the CG position and orientation. The CG position and orientation can be determined using various tracking techniques to track the HMD 100. The CG position/orientation determination unit 201 may use an inside-out tracking technique or an outside-in tracking technique. The CG position/orientation determination unit 201 may determine the CG position and orientation on the basis of the detection result (information on the position and orientation of the HMD 100) of an HMD position/orientation detection unit 104 described below.

The rendering unit 202 reads out CG (CG data) from the CG storage unit 203, and renders the read CG according to the CG position and orientation (CG camera coordinates) determined by the CG position/orientation determination unit 201. A CG image is thus generated. For example, the CG storage unit 203 stores a plurality of CG, and the rendering unit 202 reads out from the CG storage unit 203 the CG that corresponds to the world coordinates 1 detected by the CG position/orientation determination unit 201. There is no limitation to the rendering method (algorithm, rendering engine), and the rendering unit 202 may perform polygon rendering (rendering that generates (draws) polygons one by one), which is a type of real-time rendering, for example.

The processing time for rendering depends on the performance of a GPU (not shown) provided in the information processing device 200 and the data size of the CG to be rendered. A long rendering processing time causes the CG to be displayed with a delay. Accordingly, when the user moves his/her head, the change in the CG position in response to the head movement will be delayed, causing the user to experience a feeling of strangeness.

The reprojection unit 204 performs CG reprojection processing so as to reduce (limit) the above-mentioned CG delay. The reprojection unit 204 obtains information on the position and orientation of the HMD 100 (HMD position/orientation information) from the HMD position/orientation detection unit 104 via a control unit 110, which will be described below. By repeatedly obtaining HMD position/orientation information, the HMD 100 can be tracked. The reprojection unit 204 performs reprojection processing to regenerate a CG image on the basis of multiple HMD position/orientation information pieces corresponding to the respective time points and the rendering processing time. For example, the reprojection unit 204 applies changes to the CG that are the inverse of the changes in the position and orientation of the HMD 100 during rendering (from the start of rendering to the end of rendering (the start of reprojection)), and regenerates a CG image that matches the current position and orientation of the HMD 100.

In the first embodiment, it is assumed that a CG image for the left eye (left CG image) and a CG image for the right eye (right CG image) are generated. For example, to generate a left CG image, the position and orientation of the marker 500 are detected from a camera image for the left eye (left camera image) obtained by the imaging unit 101L. To generate a right CG image, the position and orientation of the marker 500 are detected from a camera image for the right eye (right camera image) obtained by the imaging unit 101R.

The composition unit 205L generates a composite image for the left eye (left composite image) by compositing the left CG image regenerated by the reprojection unit 204 into the left camera image (image of real space) obtained by the imaging unit 101L. Then, the composition unit 205L transmits the left composite image (left composite image data) to the conversion unit 106L, which will be described below.

The composition unit 205R generates a composite image for the right eye (right composite image) by compositing the right CG image regenerated by the reprojection unit 204 into the right camera image (image of real space) obtained by the imaging unit 101R. Then, the composition unit 205R transmits the right composite image (right composite image data) to a conversion unit 106R, which will be described below.

In the case of VR, since the rendering unit 202 generates an image in which a virtual object is superimposed on a virtual space, it is not necessary to use the imaging units 101R and 101L, the CG position/orientation determination unit 201, or the composition units 205L and 205R. The processing of detecting the position and orientation of the HMD 100 is performed.

Also, the first embodiment obtains images of the areas based on the position and orientation of the user's head as the composite images (left composite image and right composite image), but there is no limitation to this. The area of the composite image may be an area based on at least one of the position or the orientation of the head. The area of the composite image may be an area based on the head position (an area that is not on the basis of the head orientation), or an area based on the head orientation (an area that is not on the basis of the head position).

The HMD 100 includes the imaging units 101L and 101R, the display units 102L and 102R, the HMD position/orientation detection unit 104, the conversion units 106L and 106R, the gradation units 103L and 103R, and the control unit 110.

The imaging unit 101L captures an image of real space to obtain a left camera image. The imaging unit 101R captures an image of real space to obtain a right camera image.

The HMD position/orientation detection unit 104 detects the position and orientation of the HMD 100. As the orientation of the HMD 100, the HMD position/orientation detection unit 104 detects the rotation angle or inclination of the HMD 100, for example. There is no limitation to the method of detecting the position and orientation of the HMD 100. For example, the HMD position/orientation detection unit 104 may detect the position and orientation of the HMD 100 using at least one of an acceleration sensor, an angular velocity sensor, and a geomagnetic sensor. The HMD position/orientation detection unit 104 may detect the position and orientation of the HMD 100 using the imaging unit 101L or the imaging unit 101R. The HMD position/orientation detection unit 104 may use an inside-out tracking technique or an outside-in tracking technique.

The control unit 110 controls the entire HMD 100. For example, the control unit 110 controls the processing of the conversion units 106L and 106R and the gradation units 103L and 103R by transmitting the detection results of the HMD position/orientation detection unit 104 to the conversion units 106L and 106R and the gradation units 103L and 103R. The control unit 110 also controls the processing of the reprojection unit 204 by transmitting the detection result of the HMD position/orientation detection unit 104 to the reprojection unit 204.

The reprojection unit 204 performs reprojection processing to reduce image delays caused by the processing time of the rendering unit 202. However, an image delay may also occur due to the processing time of the CG position/orientation determination unit 201, and an image delay may occur due to the processing time of the composition units 205L and 205R. Furthermore, an image delay may occur due to the processing time of the imaging units 101L and 101R, and an image delay may occur due to the processing time of the display units 102L and 102R. Since there are various types of image delays including those, image delays cannot be sufficiently reduced by the reprojection processing alone.

To further reduce image delays, the conversion unit 106L generates a left converted image by moving or transforming the left composite image on the basis of the detection result (HMD position/orientation information) of the HMD position/orientation detection unit 104. For example, the conversion unit 106L moves the left composite image in a direction that cancels out the movement of the head in the period of reprojection and composition (from the end of rendering (the start of reprojection) to the present (the start of processing by the conversion unit 106L)). Similarly, the conversion unit 106R generates a right converted image by moving or transforming the right composite image on the basis of the detection result (HMD position/orientation information) of the HMD position/orientation detection unit 104. In the first embodiment, it is assumed that the composite images (each of the left and right composite images) are moved. The information used may be any information regarding head movement, and does not have to be information indicating the position and orientation of the HMD 100.

The gradation unit 103L performs gradation processing on the left converted image to generate a left display image. The gradation unit 103R performs gradation processing on the right converted image to generate a right display image. Different gradation processing steps are performed on the left converted image and the right converted image. The gradation processing will be described in detail below.

The display unit 102L displays the left display image. The user visually perceives the left display image displayed on the display unit 102L with his/her left eye. The display unit 102R displays the right display image. The user visually perceives the right display image displayed on the display unit 102R with his/her right eye. There is no limitation to the method of displaying (presenting) the image. For example, the image may be displayed on a display panel such as a liquid crystal panel or an organic EL panel placed opposite to the user's eyes, or the image may be projected directly onto the user's retina using a laser.

In the first embodiment, the image for the left eye and the image for the right eye have respective overlapping portions, which are image areas that correspond to each other in the images, and respective non-overlapping portions, which are image areas that do not correspond to each other in the images. For example, the left composite image and the right composite image have respective overlapping portions, which are image areas that correspond to each other in the left composite image and the right composite image, and respective non-overlapping portions, which do not correspond to each other in the left composite image and the right composite image. Also, the left display image and the right display image have respective overlapping portions, which are image areas that correspond to each other in the left display image and the right display image, and respective non-overlapping portions, which do not correspond to each other in the left display image and the right display image. For example, the overlapping portion is a portion that can be viewed stereoscopically, and the non-overlapping portion is a portion that cannot be viewed stereoscopically. Because of the processing performed by the conversion units 106L and 106R, the overlapping portions of the left and right composite images differ from the overlapping portions of the left and right display images. Likewise, the non-overlapping portions of the left and right composite images differ from the non-overlapping portions of the left and right display images.

Gradation Processing

Referring to FIGS. 3A to 3D, an example of gradation processing is now described.

Figures 3A, 3B, 3C, 3D:
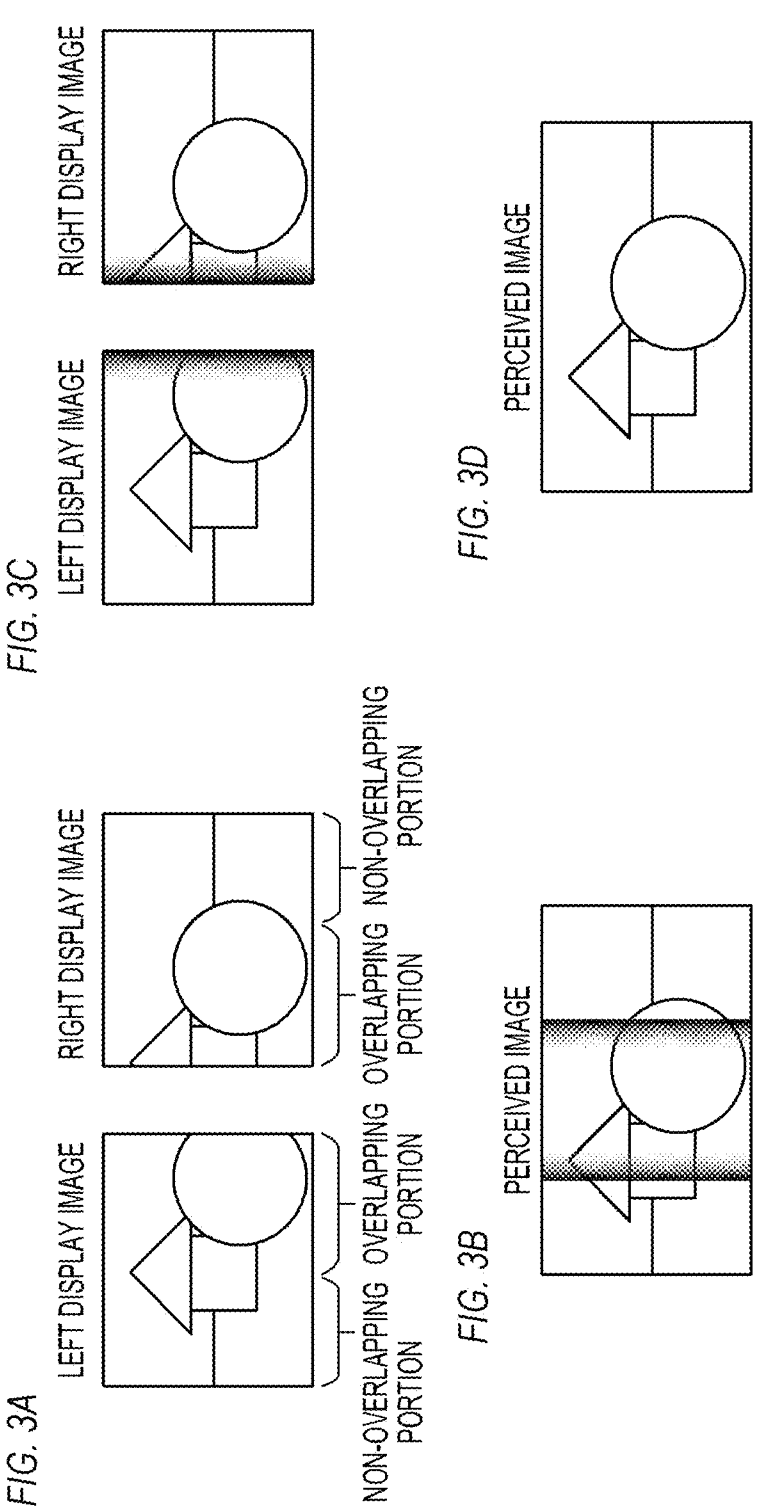
FIGS. 3A to 3D are schematic views illustrating gradation processing according to the first embodiment.

FIG. 3A is a schematic view showing an example of a left display image and a right display image in a situation where gradation processing is not performed. The left display image and the right display image have respective overlapping portions, which are image areas that correspond to each other in the left display image and the right display image, and respective non-overlapping portions, which do not correspond to each other in the left display image and the right display image.

FIG. 3B is a schematic view showing an example of an image perceived by the user when the left display image in FIG. 3A is viewed with the left eye and the right display image in FIG. 3A is viewed with the right eye. As shown in FIGS. 3A and 3B, the perception with both eyes can observe a wider area in the horizontal direction than the perception with one eye.

However, when gradation processing is not performed, black band-shaped noise may be visible at the boundary portions between the overlapping portions and the non-overlapping portions, as shown in FIG. 3B. For example, the brightness contrast changes abruptly between the overlapping portions and the non-overlapping portions, causing binocular rivalry and resulting in the appearance of black band-shaped noise.

The gradation processing reduces the change in brightness contrast between overlapping portions and the non-overlapping portions. FIG. 3C is a schematic view showing an example of a left display image and a right display image in a situation where gradation processing is performed. In the left display image, gradation processing is performed to gradually change the brightness value from the right end of the image toward the left side. In the right display image, gradation processing is performed to gradually change the brightness value from the left end of the image toward the right side.

FIG. 3D is a schematic view showing an example of an image perceived by the user when the left display image in FIG. 3C is viewed with the left eye and the right display image in FIG. 3C is viewed with the right eye. As shown in FIG. 3D, the changes in the brightness contrast between the overlapping portions and the non-overlapping portions are reduced by the gradation processing, thereby limiting the occurrence of binocular rivalry and the perception of black band-shaped noise.

Problem

When the conversion units 106L and 106R are used, the conventional gradation processing may fail to provide a sufficient effect. This problem is described with reference to FIG. 4A to 4D. The description assumes a situation where the user wearing the HMD 100 turns his/her head horizontally from right to left.

Figures 4A, 4B, 4C, 4D:
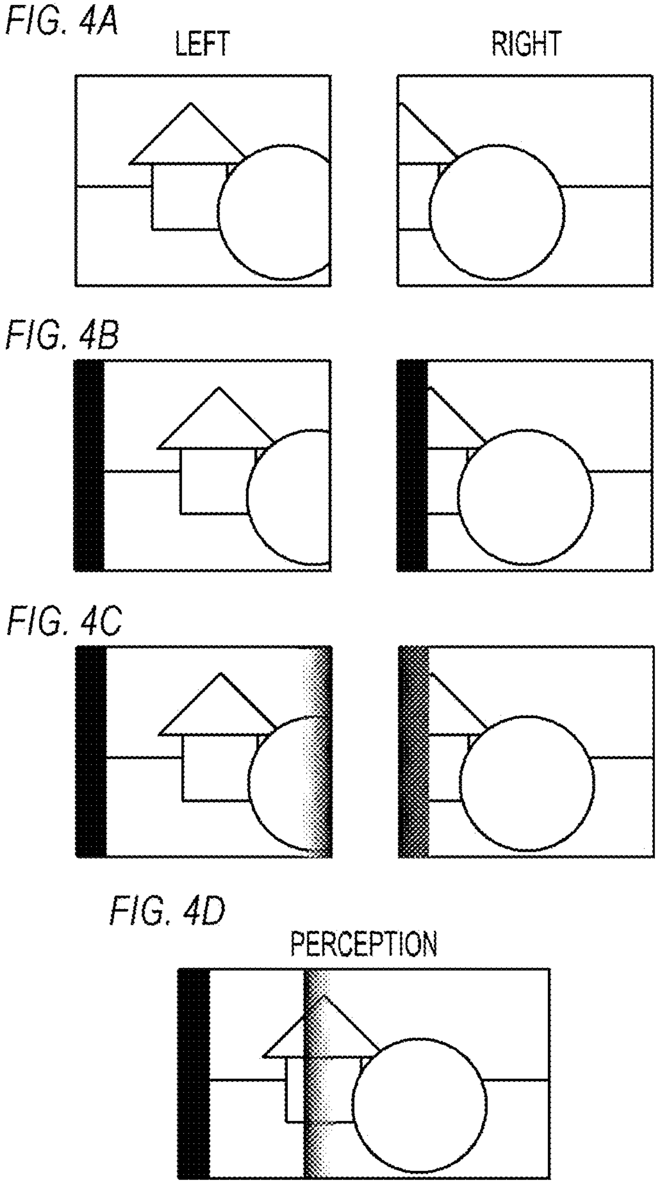
FIGS. 4A to 4D are schematic views illustrating a problem to be solved by the first embodiment.

FIG. 4A is a schematic view showing an example of a left composite image and a right composite image, and FIG. 4B is a schematic view showing an example of a left converted image and a right converted image. Because the user turns his/her head horizontally from right to left, the conversion unit 106L obtains the left converted image of FIG. 4B by moving (shifting) the left composite image of FIG. 4A to the right by an amount of movement corresponding to the amount of head movement. Similarly, the conversion unit 106R obtains the right converted image in FIG. 4B by shifting the right composite image in FIG. 4A to the right by an amount of movement corresponding to the amount of head movement. Moving the images in the direction opposite to the direction of the head movement can reduce the image delay sensed by the user. There is no image to display at the left end portion of the left converted image and at the left end portion of the right converted image. Thus, as shown in FIG. 4B, the left end portion of the left converted image and the left end portion of the right converted image are black areas.

FIG. 4C is a schematic view showing an example of a left display image obtained by applying gradation processing to the left converted image of FIG. 4B, and a right display image obtained by applying gradation processing to the right converted image of FIG. 4B. As in FIG. 3C, in the left display image, gradation processing is performed to gradually change the brightness value from the right end of the image toward the left side. In the right display image, gradation processing is performed to gradually change the brightness value from the left end of the image toward the right side. In the right converted image, since the left end portion of the image is a black area, gradation processing is performed on the black area.

FIG. 4D is a schematic view showing an example of an image perceived by the user when the left display image in FIG. 4C is viewed with the left eye and the right display image in FIG. 4C is viewed with the right eye. Since the conversion units 106L and 106R shift the left converted image and the right converted image to the right, of the two boundary portions between the overlapping portions and the non-overlapping portions, the left boundary portion (the left end portion of the overlapping portion) is shifted to the right. In the right converted image, gradation processing is not performed on the left boundary portion (the left end portion of the overlapping portion), and gradation processing is performed on the black area, which is the left end portion of the image. As a result, as shown in FIG. 4D, black band-shaped noise is visible at the left boundary portion.

For this reason, the first embodiment performs gradation processing on both of the two boundary portions between the overlapping portions and the non-overlapping portions (both the left and right end portions of the overlapping portions) on the basis of HMD position/orientation information (information regarding head movement).

Operation

Figure 5:
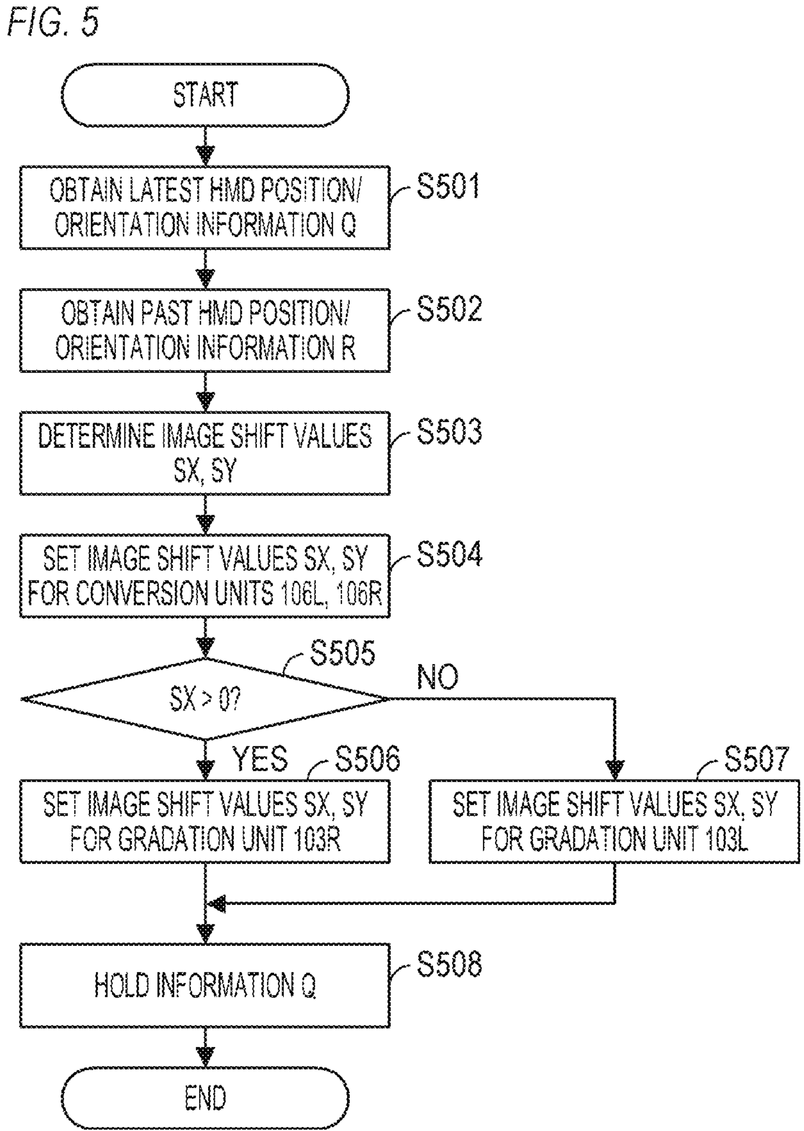
FIG. 5 is a flowchart showing an operation example according to the first embodiment.

Referring to FIGS. 5 and 6A to 6D, an operation example according to the first embodiment is described. FIG. 5 is a flowchart showing an example of an operation according to the first embodiment, and FIGS. 6A to 6D are schematic views showing examples of various images according to the first embodiment. The control unit 110 performs the process of FIG. 5 every time the image to be displayed is updated.

At S501, the control unit 110 obtains the latest (current) HMD position/orientation information Q from the HMD position/orientation detection unit 104.

At S502, the control unit 110 obtains the past HMD position/orientation information R that is held. The HMD position/orientation information R may be the HMD position/orientation information obtained at the end of rendering (at the start of reprojection), for example.

The control unit 110 can detect changes in the position and orientation of the HMD 100 during a specific period on the basis of the change from the HMD position/orientation information R to the HMD position/orientation information Q. Then, on the basis of the changes in the position and orientation of the HMD 100, the control unit 110 can determine the movement (movement direction and amount) of the image for reducing image delays.

At S503, the control unit 110 determines image shift values SX and SY indicating the movement direction and amount of the image on the basis of the change from the HMD position/orientation information R to the HMD position/orientation information Q. The positive or negative sign of the image shift value SX indicates the direction of left or right movement, and the absolute value of the image shift value SX indicates the amount of left or right movement. The positive or negative sign of the image shift value SY indicates the direction of vertical movement, and the absolute value of the image shift value SY indicates the amount of vertical movement. In the first embodiment, when the image is to be moved rightward (when it is determined that there has been head movement to face leftward), the image shift value SX is a positive value, and when the image is to be moved leftward (when it is determined that there has been head movement to face rightward), the image shift value SX is a negative value. Also, the image shift value SY is a positive value when the image is to be moved downward (when it is determined that there has been head movement to face upward), and the image shift value SY is a negative value when the image is to be moved upward (when it is determined that there has been head movement to face downward).

At S504, the control unit 110 sets the image shift values SX and SY for each of the conversion units 106L and 106R.

Figures 6A, 6B, 6C, 6D, 6E:
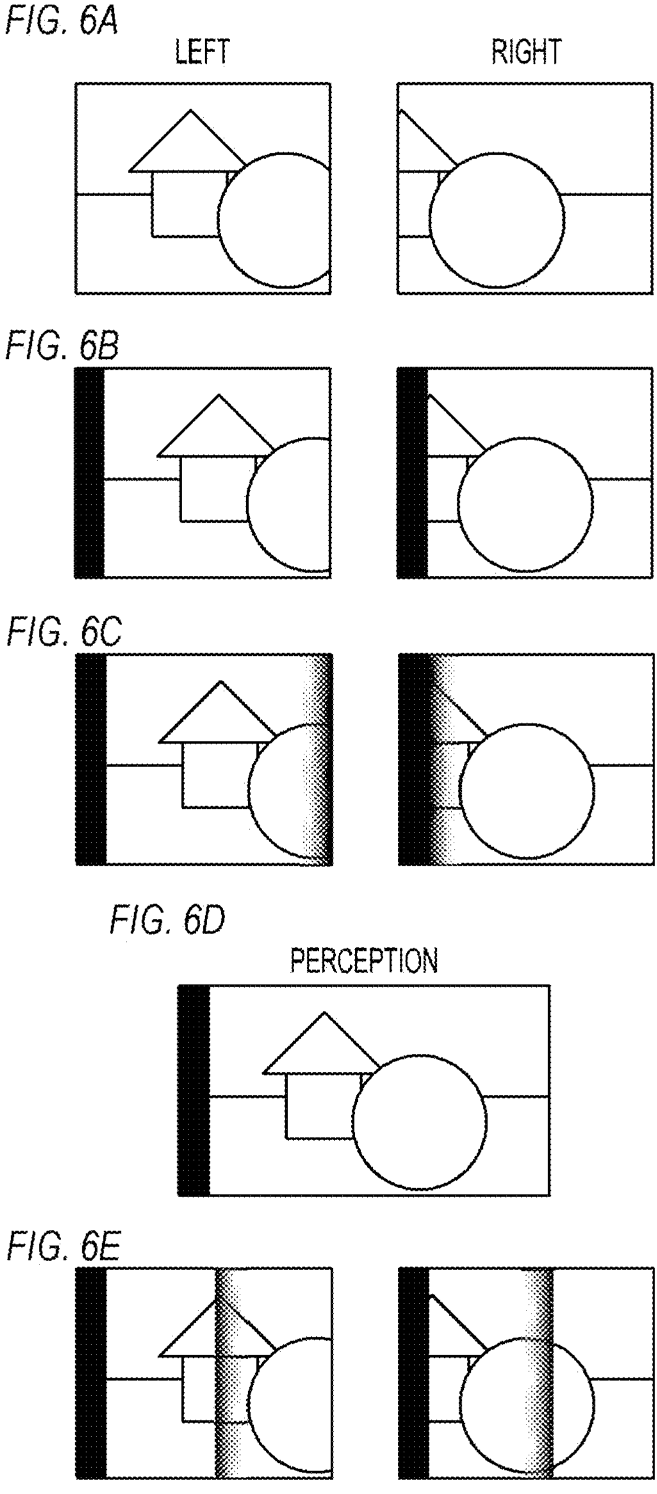
FIGS. 6A to 6E are schematic views showing examples of various images according to the first embodiment.

FIG. 6A is a schematic view showing an example of a left composite image and a right composite image, and FIG. 6B is a schematic view showing an example of a left converted image and a right converted image. Here, it is assumed that the user wearing the HMD 100 turns his/her head horizontally from right to left. As such, the control unit 110 sets the image shift value SX to a positive value and the image shift value SY to 0 for each of the conversion units 106L and 106R. Then, the conversion unit 106L obtains the left converted image of FIG. 6B by moving (shifting) the left composite image of FIG. 6A to the right by an amount of movement corresponding to the absolute value of the image shift value SX. Similarly, the conversion unit 106R obtains the right converted image of FIG. 6B by shifting the right composite image of FIG. 6A to the right by an amount of movement corresponding to the absolute value of the image shift value SX. There is no image to display at the left end portion of the left converted image and at the left end portion of the right converted image. Thus, as shown in FIG. 6B, the left end portion of the left converted image and the left end portion of the right converted image are black areas.

At S505, the control unit 110 determines whether the image shift value SX is a positive value. If the image shift value SX is a positive value (if the image is to be moved rightward, if it is determined that there has been head movement to face leftward), the process proceeds to S506. If not, the process proceeds to S507.

At S506, the control unit 110 sets the image shift values SX and SY for the gradation unit 103R. At S507, the control unit 110 sets the image shift values SX and SY for the gradation unit 103L.

In this manner, when the image shift value SX is a positive value (when the left converted image and the right converted image are shifted rightward by the conversion units 106L and 106R, when it is determined that there has been head movement to face leftward), the gradation processing to be performed on the right converted image is changed. When the image shift value SX is a negative value (when the left converted image and the right converted image are shifted leftward by the conversion units 106L and 106R, when it is determined that there has been head movement to face rightward), the gradation processing to be performed on the left converted image is changed. The first embodiment moves the area in the right converted image on which gradation processing is performed to the right when the image shift value SX is a positive value, and moves the area in the left converted image on which gradation processing is performed to the left when the image shift value SX is a negative value.

FIG. 6C is a schematic view showing an example of a left display image obtained by applying gradation processing to the left converted image of FIG. 6B, and a right display image obtained by applying gradation processing to the right converted image of FIG. 6B. Since the image shift value SX is a positive value, the gradation processing of the gradation unit 103L is not changed, and the area on which the gradation processing is performed by the gradation unit 103R is shifted to the right. Thus, in the left display image, gradation processing is performed on the right end portion of the image, and in the right display image, gradation processing is performed on the portion adjacent to the right side of the black area, which is the left end portion of the image.

In each of the left converted image and the left display image, the right end portion of the image is the right boundary portion (the right end portion of the overlapping portion) of the two boundary portions between the overlapping portions and the non-overlapping portions. In each of the right converted image and the right display image, the portion adjacent to the right side of the black area, which is the left end portion of the image, is the left boundary portion (the left end portion of the overlapping portion) of the two boundary portions. As such, in FIG. 6C, gradation processing is performed on both of the two boundary portions between the overlapping portions and the non-overlapping portions (both the left and right end portions of the overlapping portions).

Each of the left converted image and the left display image includes a valid area (area where an image to be displayed exists, area other than the black area) and an invalid area (area where no image to be displayed exists, black area) according to the movement of the head. Similarly, each of the right converted image and the right display image includes valid and invalid areas according to the head movement. In the left converted image (left display image), the right end portion of the image may be considered as the end portion of the valid area of the left converted image (left display image) on the side corresponding to the overlapping portion (the portion corresponding to a portion of the right converted image (right display image)). In the right converted image (right display image), the above-mentioned portion adjacent to the right side of the black area, which is the left end portion of the image, may also be considered as the end portion of the valid area of the right converted image (right display image) on the side corresponding to the overlapping portion (the portion corresponding to a portion of the left converted image (left display image)). The gradation processing performed on the left converted image may be considered as gradation processing that gradually changes the brightness value from the end of the valid area of the left converted image on the side corresponding to the overlapping portion (the portion corresponding to a portion of the right converted image) toward the inside of the valid area. The gradation processing performed on the right converted image may be considered as gradation processing that gradually changes the brightness value from the end of the valid area of the right converted image on the side corresponding to the overlapping portion (the portion corresponding to a portion of the left converted image) toward the inside of the valid area.

FIG. 6D is a schematic view showing an example of an image perceived by the user when the left display image in FIG. 6C is viewed with the left eye and the right display image in FIG. 6C is viewed with the right eye. By changing the area on which gradation processing is performed in accordance with changes in the overlapping portions, the gradation processing is performed on both of the two boundary portions between the overlapping portions and the non-overlapping portions (both the left and right end portions of the overlapping portions). This suitably limits the perception of black band-shaped noise, as shown in FIG. 6D.

An example has been described that performs gradation processing on the left converted image to reduce the change in brightness contrast at the right end portion of the overlapping portion, and performs gradation processing on the right converted image to reduce the change in brightness contrast at the left end portion of the overlapping portion, but there is no limitation to this. For example, as shown in FIG. 6E, gradation processing may be performed on the left converted image to reduce the change in brightness contrast at the left end portion of the overlapping portion, and gradation processing may be performed on the right converted image to reduce the change in brightness contrast at the right end portion of the overlapping portion. In this case, when the image shift value SX is a positive value (when the left converted image and the right converted image are shifted rightward by the conversion units 106L and 106R, when it is determined that there has been head movement to face leftward), the gradation processing to be performed on the left converted image is changed. When the image shift value SX is a negative value (when the left converted image and the right converted image are shifted leftward by the conversion units 106L and 106R, when it is determined that there has been head movement to face rightward), the gradation processing to be performed on the left converted image is changed.

At S508, the control unit 110 holds the HMD position/orientation information Q as past information.

As described above, according to the first embodiment, gradation processing is performed taking into account the head movement. A suitable image (an image that allows natural observation over a wide area) is thus obtainable even when image movement is performed as image processing that reduces (limits) a delay in changing the display area.

Second Embodiment

A second embodiment of the present invention is now described. In the following, the items that are the same as those in the first embodiment (such as the configuration and processing that are the same as those in the first embodiment) are not described, and the items different from the first embodiment are described.

In the first embodiment, an example is described in which the conversion units (the conversion unit 106L and the conversion unit 106R) move images. In the second embodiment, an example is described in which the conversion units (the conversion unit 106L and the conversion unit 106R) transform images (perform projective transformation).

Problem

Referring to FIGS. 7A to 7D, a problem that arises when performing conventional gradation processing is now described. The description assumes a situation where the user wearing the HMD 100 turns his/her head horizontally from right to left.

Figures 7A, 7B, 7C, 7D:
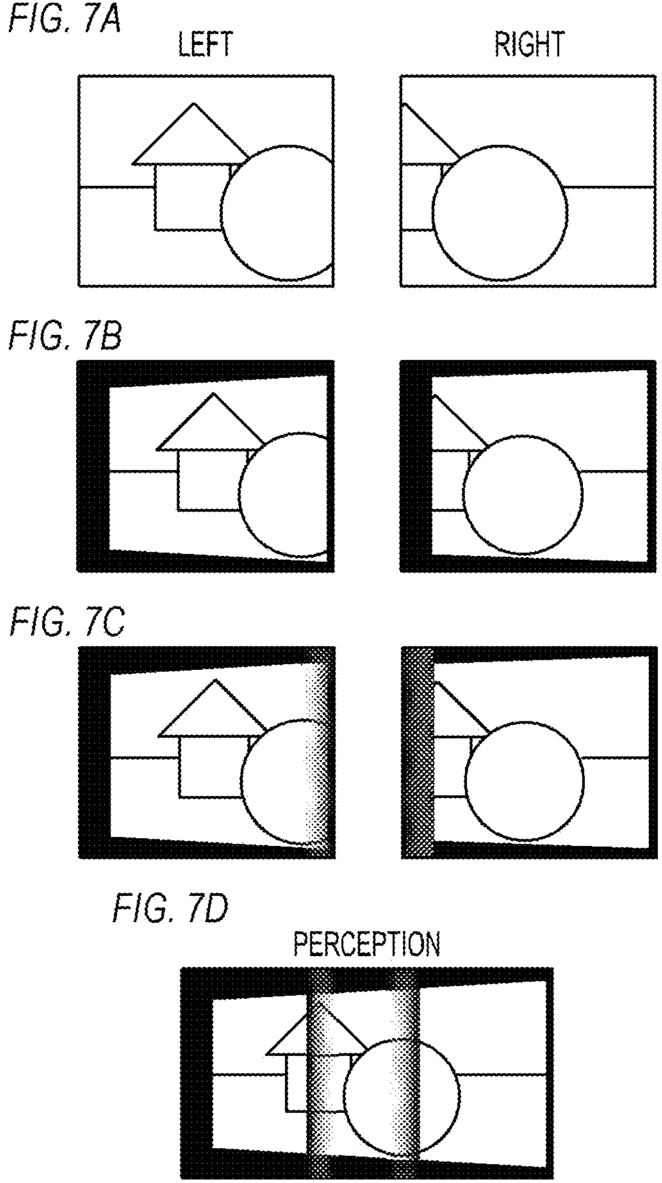
FIGS. 7A to 7D are schematic views illustrating a problem to be solved by a second embodiment.

FIG. 7A is a schematic view showing an example of a left composite image and a right composite image, and FIG. 7B is a schematic view showing an example of a left converted image and a right converted image. Because the user has turned his/her head horizontally from right to left, the conversion unit 106L obtains the left converted image of FIG. 7B by transforming the left composite image of FIG. 7A by an amount of transformation corresponding to the amount of head movement. Similarly, the conversion unit 106R obtains the right converted image in FIG. 7B by transforming the right composite image in FIG. 7A by an amount of transformation corresponding to the amount of head movement. Transformation (projective transformation) is performed that moves the image rightward, moves the left side of the image rearward, and moves the right side of the image frontward. This achieves a more natural image transition. Since the projective transformation matrices of the conversion units 106L and 106R are different, the black areas, in which the image to be displayed is absent, are also different.

FIG. 7C is a schematic view showing an example of a left display image obtained by applying gradation processing to the left converted image of FIG. 7B, and a right display image obtained by applying gradation processing to the right converted image of FIG. 7B. In the left display image, gradation processing is performed to gradually change the brightness value from the right end of the image toward the left side. In the right display image, gradation processing is performed to gradually change the brightness value from the left end of the image toward the right side.

FIG. 7D is a schematic view showing an example of an image perceived by the user when the left display image in FIG. 7C is viewed with the left eye and the right display image in FIG. 7C is viewed with the right eye. The overlapping portions change due to the processing by the conversion units 106L and 106R, and the areas in which the brightness contrast changes abruptly change, so that black band-shaped noise becomes visible at the boundary portions between the overlapping portions and non-overlapping portions.

Operation

Referring to FIGS. 8 and 9A to 9D, an operation example according to the second embodiment is described. FIG. 8 is a flowchart showing an example of an operation according to the second embodiment, and FIGS. 9A to 9D are schematic views showing examples of various images according to the second embodiment. The control unit 110 performs the processing of FIG. 8 every time the image to be displayed is updated.

At S801, the control unit 110 obtains the latest (current) HMD position/orientation information Q from the HMD position/orientation detection unit 104.

At S802, the control unit 110 obtains the past HMD position/orientation information R that is held.

At S803, the control unit 110 determines projective transformation matrices HL and HR on the basis of the change from the HMD position/orientation information R to the HMD position/orientation information Q. The projective transformation matrix HL is used to transform the left composite image, and the projective transformation matrix HR is used to transform the right composite image. To perform projective transformation centered on the center of the entire field of view of the user, two different projective transformation matrices are determined as the projective transformation matrix HL and the projective transformation matrix HR.

At S804, the control unit 110 sets the projective transformation matrix HL for the conversion unit 106L, and sets the projective transformation matrix HR for the conversion unit 106R.

Figures 9A, 9B, 9C, 9D:
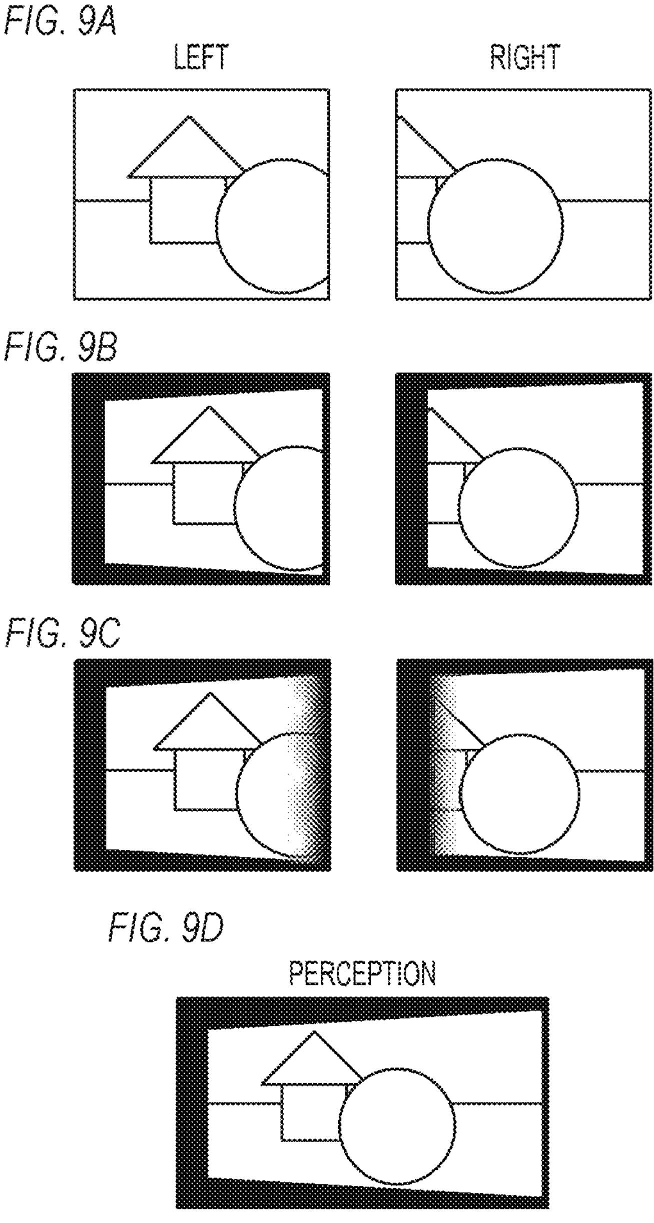
FIGS. 9A to 9D are schematic views showing examples of various images according to the second embodiment.

FIG. 9A is a schematic view showing an example of a left composite image and a right composite image, and FIG. 9B is a schematic view showing an example of a left converted image and a right converted image. Here, it is assumed that the user wearing the HMD 100 turns his/her head horizontally from right to left. Accordingly, a left converted image and a right converted image similar to those in FIG. 7B are obtained.

At S805, the control unit 110 determines processing parameters TL of the gradation unit 103L on the basis of the projective transformation matrix HL. For example, a black area in the image after projective transformation is detected on the basis of the projective transformation matrix HL, and the processing parameters TL including the width of the black area are determined. At S806, the control unit 110 sets the processing parameters TL for the gradation unit 103L.

At S807, the control unit 110 determines processing parameters TR of the gradation unit 103R on the basis of the projective transformation matrix HR. At S808, the control unit 110 sets the processing parameters TR for the gradation unit 103R.

The processing parameters TL and TR of the gradation units 103L and 103R may be processing parameters that modify the area on which gradation processing is performed (for example, the position, the horizontal size (width), the vertical size (height), or the shape). The processing parameters TL and TR may be processing parameters that indicate the intensity of the gradation processing. The processing parameters TL and TR may be processing parameters that modify both the area and the intensity of the gradation processing.

FIG. 9C is a schematic view showing an example of a left display image obtained by applying gradation processing to the left converted image of FIG. 9B, and a right display image obtained by applying gradation processing to the right converted image of FIG. 9B. FIG. 9D is a schematic view showing an example of an image perceived by the user when the left display image in FIG. 9C is viewed with the left eye and the right display image in FIG. 9C is viewed with the right eye. In FIG. 9C, by changing the area on which gradation processing is performed in accordance with changes in the overlapping portions, the gradation processing is suitably performed on both of the two boundary portions between the overlapping portions and the non-overlapping portions (both the left and right end portions of the overlapping portions). It may be considered that gradation processing is performed on the boundary portions between the valid areas and the invalid areas (black areas). This suitably limits the perception of black band-shaped noise, as shown in FIG. 9D.

At S809, the control unit 110 holds the HMD position/orientation information Q as past information.

As described above, gradation processing is performed taking into account the head movement also in the second embodiment. A suitable image (an image that allows natural observation over a wide area) is thus obtainable even when image transformation (projective transformation) is performed as image processing that reduces (limits) a delay in changing the display area.

Third Embodiment

A third embodiment of the present invention is now described. In the following, the items that are the same as those in the first embodiment (such as the configuration and processing that are the same as those in the first embodiment) are not described, and the items different from the first embodiment are described. An example is described in which image movement is performed as image processing that reduces image delays, but image transformation (projective transformation) may also be performed.

With the first and second embodiments, examples have been described in which the image processing that reduces image delays is performed only once after reprojection. With the third embodiment, an example is described in which image processing that reduces image delays is performed twice after reprojection in order to further reduce image delays.

Configuration

FIG. 10 is a schematic view showing an example of the configuration of a system according to the third embodiment.

The information processing device 200 has a CG position/orientation determination unit 201, a rendering unit 202, a CG storage unit 203, and a reprojection unit 204. The reprojection unit 204 transmits a left CG image (left CG image data) after reprojection to a first conversion unit 107L described below, and transmits a right CG image (right CG image data) after reprojection to a first conversion unit 107R described below.

The HMD 100 includes imaging units 101L and 101R, display units 102L and 102R, an HMD position/orientation detection unit 104, first conversion units 107L and 107R, composition units 105L and 105R, second conversion units 108L and 108R, gradation units 103L and 103R, and a control unit 110.

To reduce image delays, the first conversion unit 107L generates a first left converted image by moving or transforming the left CG image on the basis of the detection result (HMD position/orientation information) of the HMD position/orientation detection unit 104. For example, the first conversion unit 107L moves the left CG image in a direction that cancels out the movement of the head during reprojection (from the end of rendering (the start of reprojection) to the end of reprojection (the start of processing by the first conversion unit 107L)). Similarly, the first conversion unit 107R generates a first right converted image by moving or transforming the right CG image on the basis of the detection result (HMD position/orientation information) of the HMD position/orientation detection unit 104.

The composition unit 105L generates a left composite image by compositing the first left converted image obtained by the first conversion unit 107L into the left camera image (image of real space) obtained by the imaging unit 101L. Similarly, the composition unit 105R generates a right composite image by compositing the first right converted image obtained by the first conversion unit 107R into the right camera image (image of real space) obtained by the imaging unit 101R.

To reduce image delays, the second conversion unit 108L generates a second left converted image by moving or transforming the left composite image on the basis of the detection result (HMD position/orientation information) of the HMD position/orientation detection unit 104. For example, the second conversion unit 108L moves the left composite image in a direction that cancels out the head movement during the processing period of the first conversion unit 107L and the composition unit 105L (from the end of reprojection (the start of processing by the first conversion unit 107L) to the present (the end of composition, the start of processing by the second conversion unit 108L)). Similarly, the second conversion unit 108R generates a second right converted image by moving or transforming the right composite image on the basis of the detection result (HMD position/orientation information) of the HMD position/orientation detection unit 104.

The gradation unit 103L performs gradation processing on the second left converted image to generate a left display image. The gradation unit 103R performs gradation processing on the second right converted image to generate a right display image.

Operation

Referring to FIGS. 11 and 12A to 12G, an operation example according to the third embodiment is described. FIG. 11 is a flowchart showing an example of an operation according to the third embodiment, and FIGS. 12A to 12G are schematic views showing examples of various images according to the third embodiment. The control unit 110 performs the processing of FIG. 11 every time the image to be displayed is updated.

At S1101, the control unit 110 obtains the latest HMD position/orientation information Q1 (at the end of reprojection, at the start of processing by the first conversion unit 107L) from the HMD position/orientation detection unit 104.

At S1102, the control unit 110 obtains the past HMD position/orientation information R1 that is held. The HMD position/orientation information R1 may be the HMD position/orientation information obtained at the end of rendering (at the start of reprojection), for example.

At S1103, the control unit 110 determines image shift values SX1 and SY1 indicating the movement direction and amount of the image on the basis of the change from HMD position/orientation information R1 to HMD position/orientation information Q1

At S1104, the control unit 110 sets the image shift values SX1 and SY1 for each of the first conversion units 107L and 107R. Then, the first conversion unit 107L, the first conversion unit 107R, the composition unit 105L, and the composition unit 105R perform processing.

Figures 12A, 12B, 12C, 12D, 12E, 12F, 12G:
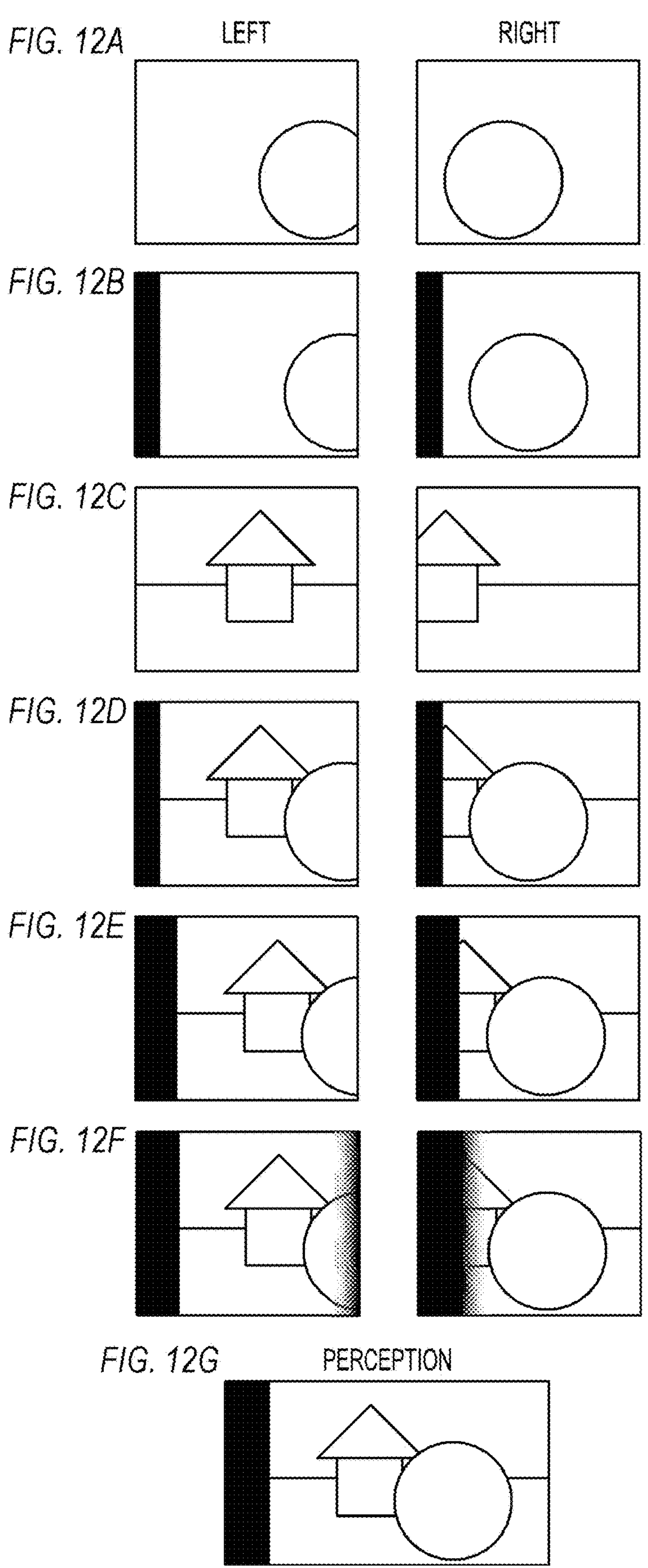
FIGS. 12A to 12G are schematic views showing examples of various images according to the third embodiment.

FIG. 12A is a schematic view showing an example of a left CG image and a right CG image after reprojection, and FIG. 12B is a schematic view showing an example of a first left converted image and a first right converted image. Here, it is assumed that the user wearing the HMD 100 turns his/her head horizontally from right to left. As such, the control unit 110 sets the image shift value SX1 to a positive value and the image shift value SY1 to 0 for each of the first conversion units 107L and 107R. Then, the first conversion unit 107L obtains the first left converted image of FIG. 12B by moving (shifting) the left CG image of FIG. 12A to the right by an amount of movement corresponding to the absolute value of the image shift value SX1. Similarly, the first conversion unit 107R obtains the first right converted image of FIG. 12B by moving the right CG image of FIG. 12A to the right by an amount of movement corresponding to the absolute value of the image shift value SX1. There is no image to be displayed at the left end portion of the first left converted image and at the left end portion of the first right converted image. Thus, as shown in FIG. 12B, the left end portion of the first left converted image and the left end portion of the first right converted image are black areas.

FIG. 12C is a schematic view showing an example of a left camera image (image of real space) obtained by the imaging unit 101L and a right camera image (image of real space) obtained by the imaging unit 101R. FIG. 12D is a schematic view showing an example of a left composite image obtained by the composition unit 105L and a right composite image obtained by the composition unit 105R. The left composite image in FIG. 12D is an image obtained by compositing the first left converted image of FIG. 12B into the left camera image of FIG. 12C. The right composite image of FIG. 12D is an image obtained by compositing the first right converted image of FIG. 12B into the right camera image of FIG. 12C. By performing the processing by the first conversion units 107L and 107R, it is possible to suitably composite (superimpose) CG on the camera image. CG cannot be rendered at the left end portion of the first left converted image and the left end portion of the first right converted image. Thus, as shown in FIG. 12D, the left end portion of the left composite image and the left end portion of the right composite image are black areas.

At S1105, the control unit 110 holds the HMD position/orientation information Q1 as past HMD position/orientation information R2.

At S1106, the control unit 110 obtains the latest HMD position/orientation information Q2 (at the end of composition, at the start of processing by the second conversion unit 108L) from the HMD position/orientation detection unit 104.

At S1107, the control unit 110 determines image shift values SX2 and SY2 indicating the movement direction and amount of the image on the basis of the change from HMD position/orientation information R2 to HMD position/orientation information Q2.

At S1108, the control unit 110 sets the image shift values SX2 and SY2 for each of the second conversion units 108L and 108R. Then, the second conversion unit 108L and the second conversion unit 108R perform processing.

FIG. 12E is a schematic view showing an example of the second left converted image and the second right converted image. As described above, it is assumed that the user wearing the HMD 100 turns his/her head horizontally from right to left. As such, the control unit 110 sets the image shift value SX2 to a positive value and the image shift value SY2 to 0 for each of the second conversion unit 108L and the second conversion unit 108R. Then, the second conversion unit 108L obtains the second left converted image of FIG. 12E by moving (shifting) the left composite image of FIG. 12D to the right by an amount of movement corresponding to the absolute value of the image shift value SX2. Similarly, the second conversion unit 108R obtains the second right converted image of FIG. 12E by moving the right composite image of FIG. 12D to the right by an amount of movement corresponding to the absolute value of the image shift value SX2. There is no image to be displayed at the left end portion of the second left converted image and at the left end portion of the second right converted image. Thus, as shown in FIG. 12E, the left end portion of the second left converted image and the left end portion of the second right converted image are black areas. Since the images are shifted twice to the right, the black areas in FIG. 12E are larger than the black areas in FIGS. 12B and 12D.

At S1109, the control unit 110 calculates image shift values SX3 and SY3 (total image shift amount). The control unit 110 calculates the image shift value SX3 by adding the image shift value SX2 to the image shift value SX1, and calculates the image shift value SY3 by adding the image shift value SY2 to the image shift value SY1.

At S1110, the control unit 110 determines whether the image shift value SX3 is a positive value. If the image shift value SX3 is a positive value (if the image is to be moved rightward, if it is determined that there has been head movement to face leftward), the process proceeds to S1111. If not, the process proceeds to S1112.

At S1111, the control unit 110 sets image shift values SX3 and SY3 for the gradation unit 103R. At S1112, the control unit 110 sets image shift values SX3 and SY3 for the gradation unit 103L.

FIG. 12F is a schematic view showing an example of a left display image obtained by applying gradation processing to the second left converted image of FIG. 12E, and a right display image obtained by applying gradation processing to the second right converted image of FIG. 12E. Since the image shift value SX3 is a positive value, the gradation processing of the gradation unit 103L is not changed, and the area on which the gradation processing is performed by the gradation unit 103R is shifted to the right. Thus, in the left display image, gradation processing is performed on the right end portion of the image, and in the right display image, gradation processing is performed on the portion adjacent to the right side of the black area, which is the left end portion of the image.

In each of the second left converted image and the left display image, the right end portion of the image is the right boundary portion (the right end portion of the overlapping portion) of the two boundary portions between the overlapping portions and the non-overlapping portions. In each of the second right converted image and the right display image, the portion adjacent to the right side of the black area, which is the left end portion of the image, is the left boundary portion (the left end portion of the overlapping portion) of the two boundary portions. As such, in FIG. 12F, gradation processing is performed on both of the two boundary portions between the overlapping portions and the non-overlapping portions (both the left and right end portions of the overlapping portions).

At S1113, the control unit 110 holds the HMD position/orientation information Q2 as past information.

As described above, according to the third embodiment, gradation processing is performed on the basis of two pieces of information regarding head movement, which are information used in the first image processing that reduces image delays and information used in the second image processing. A suitable image (an image that allows natural observation over a wide area) is thus obtainable even when image processing that reduces image delays is performed twice.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

The present invention provides a technique that can obtain a suitable image (an image that allows natural observation over a wide area) even when performing image processing that reduces (limits) a delay in changing the display area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-136316, filed on Aug. 24, 2023, which is hereby incorporated by reference herein in its entirety.

What is claimed is:

1. An image processing device comprising
one or more processors and/or circuitry configured to
perform first acquisition processing to acquire:
a first image that is an image for a left eye, the first image being an image of an area based on at least one of a position and an orientation of a head of a user; and
a second image that is an image for a right eye, the second image being an image of an area based on at least one of the position and the orientation of the head and including a portion corresponding to a portion of the first image,
perform second acquisition processing to acquire information regarding movement of the head,
perform, on a basis of the information, first image processing to generate a third image by moving or transforming the first image and to generate a fourth image by moving or transforming the second image, and
perform second image processing to perform gradation processing on each of the third image and the fourth image, wherein
in the second image processing, the gradation processing is performed on a basis of the information.

2. The image processing device according to claim 1, wherein
the portion of the first image and the portion of the second image that correspond to each other are portions that are stereoscopically viewable.

3. The image processing device according to claim 1, wherein,
in the second image processing, an area on which the gradation processing is performed is changed on a basis of the information.

4. The image processing device according to claim 1, wherein,
in the second image processing, on a basis of the information, the gradation processing is performed on boundary portions in overlapping portions of the third image and the fourth image with non-overlapping portions of the third image and the fourth image.

5. The image processing device according to claim 4, wherein
each of the third image and the fourth image includes a valid area and an invalid area according to the movement of the head, and
in the second image processing, on a basis of the information, the gradation processing is performed on
an end portion of the valid area of the third image on a side corresponding to a portion that corresponds to a portion of the fourth image, and
an end portion of the valid area of the fourth image on a side corresponding to a portion that corresponds to a portion of the third image.

6. The image processing device according to claim 5, wherein
in the second image processing,
a gradation processing to gradually change a brightness value from an end of the valid area of the third image on the side corresponding to the portion that corresponds to the portion of the fourth image toward an inside of the valid area, and
a gradation processing to gradually change a brightness value from an end of the valid area of the fourth image on the side corresponding to the portion that corresponds to the portion of the third image toward an inside of the valid area
are performed on a basis of the information.

7. The image processing device according to claim 1, wherein
in the second image processing, at least one of
an area on which the gradation processing is performed, and
intensity of the gradation processing
is changed on a basis of the information.

8. The image processing device according to claim 1, wherein
in the second image processing, on a basis of the information, different gradation processing are performed on the third image and the fourth image.

9. The image processing device according to claim 1, wherein in the second image processing, on a basis of the information, gradation processing to be performed on the third image is changed in a case where it is determined that the head is moved to face rightward, and gradation processing to be performed on the fourth image is changed in a case where it is determined that the head is moved to face leftward.

10. The image processing device according to claim 9, wherein in the second image processing, on a basis of the information, an area in the third image on which the gradation processing is performed is moved leftward in a case where it is determined that the head is moved to face rightward, and an area in the fourth image on which the gradation processing is performed is moved rightward in a case where it is determined that the head is moved to face leftward.

11. The image processing device according to claim 1, wherein the one or more processors and/or circuitry is configured to further perform third acquisition processing to acquire an image of real space, in the first image processing, on a basis of first information regarding the movement of the head acquired by the second acquisition processing, a fifth image is generated by moving or transforming the first image, and a sixth image is generated by moving or transforming the second image, a seventh image is generated by compositing the fifth image into the image of the real space, an eighth image is generated by compositing the sixth image into the image of the real space, and on a basis of second information regarding the movement of the head acquired by the second acquisition processing, the third image is generated by moving or transforming the seventh image, and the fourth image is generated by moving or transforming the eighth image, and in the second image processing, the gradation processing is performed on a basis of the first information and the second information.

12. An image processing method comprising:

acquiring a first image that is an image for a left eye, the first image being an image of an area based on at least one of a position and an orientation of a head of a user, and a second image that is an image for a right eye, the second image being an image of an area based on at least one of the position and the orientation of the head and including a portion corresponding to a portion of the first image;

acquiring information regarding movement of the head;

generating, on a basis of the information, a third image by moving or transforming the first image and to generate a fourth image by moving or transforming the second image; and performing gradation processing on each of the third image and the fourth image, wherein the gradation processing is performed on a basis of the information.

13. A non-transitory computer readable medium that stores a program, wherein the program causes a computer to execute an image processing method comprising:

acquiring a first image that is an image for a left eye, the first image being an image of an area based on at least one of a position and an orientation of a head of a user, and a second image that is an image for a right eye, the second image being an image of an area based on at least one of the position and the orientation of the head and including a portion corresponding to a portion of the first image;

acquiring information regarding movement of the head;

generating, on a basis of the information, a third image by moving or transforming the first image and to generate a fourth image by moving or transforming the second image; and performing gradation processing on each of the third image and the fourth image, wherein the gradation processing is performed on a basis of the information.

* * * * *